Figure 2:
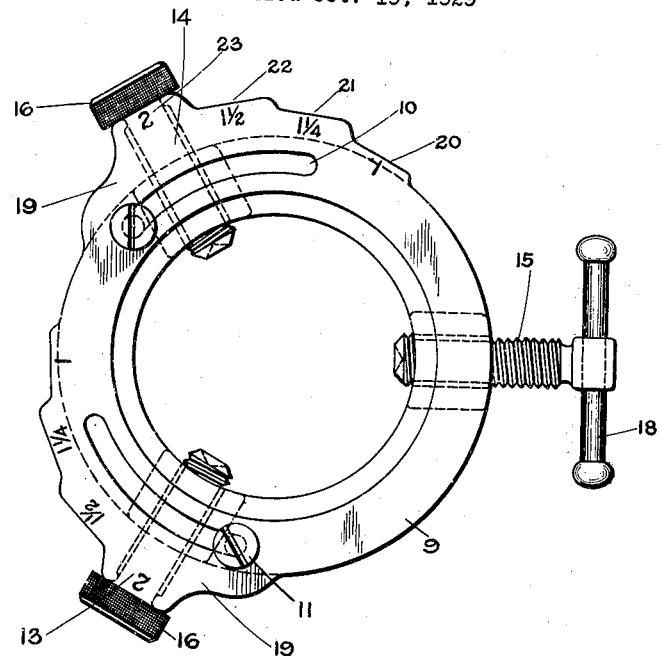

Sept. 11, 1934.  W. O. THEWES  1,973,231
DIE STOCK
Filed Oct. 19, 1929

INVENTOR
WILLIAM O. THEWES.
BY
ATTORNEY

Patented Sept. 11, 1934

1,973,231

UNITED STATES PATENT OFFICE 1,973,231

DIE STOCK

William O. Thewes, North Ridgeville, Ohio, assignor to The Ridge Tool Company, North Ridgeville, Ohio, a corporation of Ohio Application October 19, 1929, Serial No. 400,912

12 Claims. (Cl. 10—107)

The thread cutting machines now available for the purpose of cutting threads on pipes are adjustable, or rather adaptable, to work of varying dimensions. At the present time however, this adjustment, or more accurately speaking, adaptation, is effected only with considerable inconvenience and annoyance. This nuisance factor is inherent with the practice, now commonly in vogue, of providing clamping instrumentalities which function to positively hold the pipe in position that are operative on work of only one size. When tubing of some smaller size is to be threaded it is built up by a suitable bushing arrangement, to the size at which the clamping instrumentalities properly grip the same.

I propose by the instant invention, to obviate the foregoing undesirable condition by providing clamping instrumentalities which are themselves adjustable to accommodate work of varying dimensions.

The practice now meeting favor is to avail of a plurality of spaced screw members which are threaded against the pipe or bushing, as the case may be, to hold the pipe in position. It is my aim to depart from this arrangement as little as possible and yet provide easily adjustable, effectively operable clamping instrumentalities.

I therefore provide limiting means for at least two of the screw members. These limiting means serve as stops against which the screw members are threaded. A pipe is then positioned and a third screw member tightened thereagainst to position the pipe. The two points determined by the initially adjusted screw members and the pipe define the position of the latter.

Carrying out the idea a little more in detail it is an object of the invention to provide, in association with each of the screw members, a series of graduated abutment means which are suitably arranged so that any one of them may be brought into effective position with respect to the screw members.

Couching an object of the invention in somewhat different language, I aim to provide instrumentalities which may be adjusted according to the size of the pipe to determine two points on the cylindrical surface thereof, and a third member which may be tightened against the pipe to cooperate with the first mentioned instrumentalities in holding the latter in position.

With these and other more detailed objects and advantages in view, as will in part become apparent, and in part be hereinafter stated, the invention comprises certain novel constructions, combinations, and arrangement of parts, as will be subsequently specified and claimed.

Figure 1:
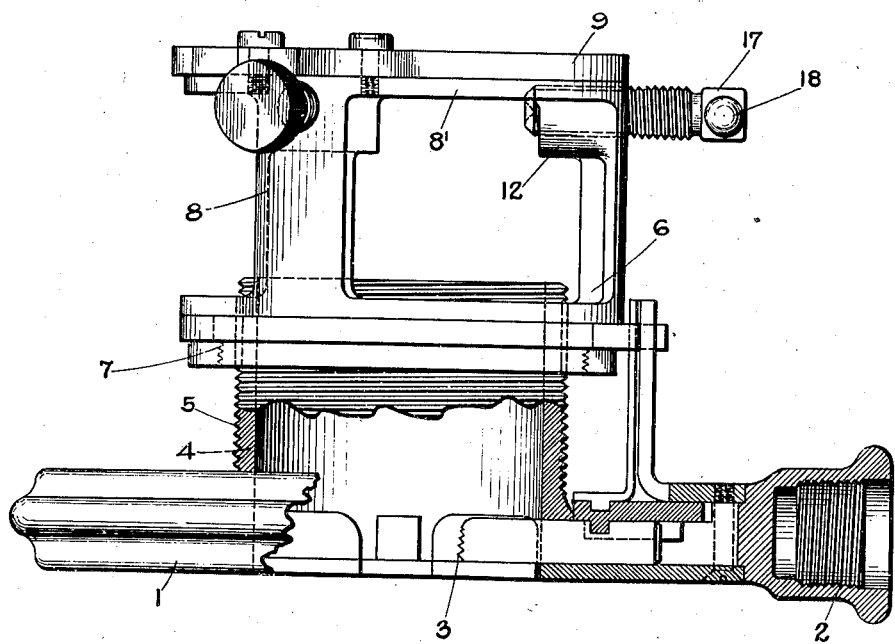

For a full and more complete understanding of the invention, reference may be had to the following description and accompanying drawing, wherein:

Fig. 1 is a plan view, partly in section, and partly in elevation, of a pipe threading machine made in accordance with this invention, certain parts being shown in dotted lines; and Fig. 2 is a front elevational view of the construction shown in Fig. 1, certain positions being indicated by dotted lines.

While a preferred specific embodiment of the invention is herein set forth, it is to be understood that I am not to be limited to the exact constructions illustrated and described because various modifications of these details may be provided in putting the invention into practice within the purview of the appended claims.

A pipe threading machine, as shown in the drawing comprises a carrier member 1, which is provided with an operating member receiving means in the form of a threaded socket 2. The member 1 carries dies or cutters 3 which cut into the metal of a pipe to provide threads in a manner to be hereinafter more fully set out. Outstanding from the member 1 is a hub 4 which is threaded as shown at 5.

A sort of skeleton construction or framework is referred to generally by the reference character 6 and includes a composite ring unit 7 that is threaded on the hub 4. Arms 8, in the present instance three in number, are spaced around the ring 7 and extend therefrom. The outer ends of the arms 8 terminate in a ring construction 8' which is preferably integral with the arms. This part 8' carries a ringlike adjusting plate 9. The latter is formed with arcuate slots 10 through which extend screw bolts 11. This bolt and slot construction constitute the means for holding the plate on the skeleton 6. The screw bolts 11, are of course threaded into the member 8' and have their heads engaging the ring 9 when positioning the latter.

It is notable that each of the arms 8 is formed on its outer extremity with an enlarged portion 12. At their enlarged portions the arms 8 are threaded radially and receive the screw clamp members 13, 14 and 15. The screws 13 and 14 are headed as shown at 16, the under side of the heads 16 being flat for abutment purposes as will be later described. The screw clamp 15 is formed with a head 17 which carries an operating member capable of affording sufficient leverage to clamp the pipe to be held in position. This operating member may take the form of the bar shown at 18.

In the present instance two of the slots 10 are provided as two points are sufficient to properly determine the position of a certain sized pipe in the holding device. At its periphery, and adjacent to the slots 10, the plate 9 is formed with the projecting portions 19, clearly shown in Fig. 2. Each of the portions 19 is formed with a series of graduated abutments in the form of flats indicated at 20, 21, 22 and 23. In the instant construction, the holding device is shown as designed to accommodate four different sizes of tubing, the portion 19 being provided with four flats, that constitute limiting means for determining the positions of the screw members 13 and 14 when the latter are adjusted to a given size pipe.

It is evident that when the heads 16 abut the flats 23, screws 13 and 14 are in position for receiving the largest size pipe the machine is designed to take care of. Now should the flats 22 be positioned so that they act as limits for the members 13 and 14, and the latter screwed up tight thereagainst, then a different size of pipe is properly receivable in the holding means. Likewise with the flats 21 and 20.

The plate 9 is adjusted to bring the desired limiting flats into operative position by a loosening of the screws 11. When these screws are tightened after adjustment of the plate 9, the latter is held in position.

The plate 9 is preferably marked with suitable indicia adjacent each of the flats 20, 21, 22 and 23 to indicate the size pipe each provides for.

The operation of the foregoing construction may be briefly outlined as follows:

The dimension (diametric) of a tube to be threaded is first ascertained whereupon the plate 9 is adjusted to position the proper limiting abutments. Screw clamps 13 and 14 are then screwed down until the heads 16 snugly lie against the flats disposed therebeneath. The tube is then inserted in the machine so that the end to be threaded is properly disposed with respect to the dies 3. The operating member 18 is then availed of to tighten the clamp 15, which co-operate with screws 13 and 14 in positively and accurately positioning the pipe. The carrier member 1 may now be rotated to perform the thread cutting operations.

I claim:

1. A work holder of the class specified comprising a frame, clamping screws mounted for radial adjustment in said frame, an adjusting ring mounted for angular adjustment with respect to said screws, and stepped abutments carried by said ring and cooperating with said screws to limit the radial movement of the latter in accordance with a predetermined clamping adjustment.

2. A work holder of the class specified comprising a frame, clamping screws mounted for radial adjustment in said frame, an adjusting ring mounted for angular adjustment with respect to said screws, and circumferentially stepped abutments carried by said ring and cooperating with said screws to limit the radial movement of the latter in accordance with a predetermined clamping adjustment.

3. A work holder of the class specified comprising an annular frame, clamping screws mounted for radial adjustment in said frame, an adjusting ring mounted for angular adjustment on said frame, and circumferentially stepped abutments carried by said ring and cooperating with the heads of said screws to limit the radial inward movement of the latter in accordance with a predetermined clamping adjustment.

4. A work holder for thread-cutting machines comprising a frame, a pair of angularly-spaced clamping screws threaded for radial adjustment in said frame, an adjusting ring for said screws, said ring being formed with circumferentially stepped abutments adapted to limit the radial inward adjustment of the screws, and a third screw for clamping the work against said first-named screws.

5. A work holder for thread-cutting machines comprising an annular frame, a pair of angularly-spaced clamping screws threaded for radial adjustment in said frame, a third screw for clamping the work against said pair of screws, and indexing means for said first-named screws, said means comprising an angularly-adjustable ring formed with circumferentially stepped abutments adapted to cooperate with the heads of the screws.

6. A work holder for thread-cutting machines comprising an annular frame, clamping screws threaded for radial adjustment in said frame, an adjusting ring mounted on said frame, said ring being slotted to permit angular adjustment with respect to said screws, and circumferentially stepped abutments formed on said ring and cooperating with the heads of the clamping screws to limit the inward radial movement of the latter.

7. In a work holder for thread-cutting machines, a frame, a plurality of angularly spaced clamping screws threaded for radial adjustment in said frame, and a circumferentially stepped adjusting ring for at least two of said screws mounted for relative angular adjustment on said frame.

8. A workholder for thread-cutting machines comprising an annular frame, clamping screws threaded for radial adjustment in said frame, a slotted adjusting ring positioned on one end of said frame and secured to the latter by means of screw bolts which extend through said slots and are threaded into the frame to permit angular adjustment of said ring, and circumferentially stepped indexed abutments formed on the periphery of said ring and cooperating with the heads of the clamping screws to limit the inward radial movement of the latter.

9. A work holder of the class specified comprising a frame, clamping screws mounted for radial adjustment in said frame, an adjusting ring mounted on said frame and adapted for angular adjustment with respect to said screws, and visible graduated abutments carried by said ring and cooperating with said screws to limit the radial movement of the latter in accordance with a predetermined clamping adjustment.

10. In combination, a thread-cutting die provided with a barrel adapted to support a work holder, a work holder mounted on said barrel and adapted for longitudinal movement relatively to the die, said holder comprising a frame, a plurality of work-gripping members mounted for radial adjustment in said frame and means for simultaneously and positively indexing two of said members independently of the remaining gripping members in accordance with the diameter of the work to be gripped in said holder, the remaining gripping member or members being freely adjustable to grip the work in conjunction with said indexed members.

11. In combination, a thread-cutting die provided with a barrel adapted to support a work holder, a work holder mounted on said barrel and adapted for positive longitudinal movement relatively to the die, said holder comprising a substantially annular frame, a plurality of work-gripping members mounted for radial adjustment in said frame, at least two of said members being spaced circumferentially at substantially 120° with respect to one another, and means for simultaneously and positively indexing two of said members independently of the remaining gripping members in accordance with the diameter of the work to be gripped in said holder, the remaining gripping member or members being freely adjustable to grip the work in conjunction with said indexed members.

12. In combination, a thread-cutting die provided with a support for a work holder, a work holder mounted on said support and adapted for positive longitudinal movement relatively to the die, said holder comprising a frame, at least three radially adjustable members in said frame for positioning work relatively to the die, and an annular rotatable member having indexed abutments thereon arranged to simultaneously and positively locate and index the radial position of at least two of said members independently of the remaining gripping member or members.

WILLIAM O. THEWES.